United States Patent
Ellis et al.

(10) Patent No.: US 8,688,295 B2
(45) Date of Patent: Apr. 1, 2014

(54) RESPONSE MODE FOR CONTROL SYSTEM OF PILOTED CRAFT

(75) Inventors: Kristopher Ellis, Ottawa (CA); Arthur W. Gubbels, Nepean (CA)

(73) Assignee: National Research Council of Canada, Ottawa, Ontario (CA)

(*) Notice: Subject to any disclaimer, the term of this patent is extended or adjusted under 35 U.S.C. 154(b) by 0 days.

(21) Appl. No.: 13/516,381

(22) PCT Filed: Dec. 18, 2009

(86) PCT No.: PCT/CA2009/001866
§ 371 (c)(1),
(2), (4) Date: Jun. 15, 2012

(87) PCT Pub. No.: WO2011/072362
PCT Pub. Date: Jun. 23, 2011

(65) Prior Publication Data
US 2012/0253561 A1    Oct. 4, 2012

(51) Int. Cl.
*G05D 1/00* (2006.01)
*B64C 19/00* (2006.01)

(52) U.S. Cl.
USPC ............................................. 701/3; 244/75.1

(58) Field of Classification Search
USPC .................... 701/3, 8, 75.1; 700/85
See application file for complete search history.

(56) References Cited

U.S. PATENT DOCUMENTS

| | | | |
|---|---|---|---|
| 3,920,966 A * | 11/1975 | Knemeyer et al. | 700/85 |
| 4,148,452 A | 4/1979 | Niessen et al. | |
| 4,198,021 A | 4/1980 | Meredith et al. | |
| 4,420,808 A | 12/1983 | Diamond et al. | |
| 4,645,141 A | 2/1987 | McElreath | |
| 4,879,643 A | 11/1989 | Chakravarty et al. | |
| 5,424,950 A | 6/1995 | Jackson | |
| 5,446,666 A | 8/1995 | Bauer | |
| 5,596,499 A | 1/1997 | Glusman et al. | |
| 6,622,065 B2 | 9/2003 | Mezan | |

(Continued)

FOREIGN PATENT DOCUMENTS

| | | |
|---|---|---|
| DE | 3635899 | 5/1988 |
| GB | 2000609 | 1/1979 |
| JP | 2004268730 | 9/2004 |
| WO | 0121981 | 3/2001 |

OTHER PUBLICATIONS

Fletcher et al., "UH-60M Upgrade Fly-By-Wire Flight Control Risk Reduction Using the RASCAL JUH-60A In-Flight Simulator", American Helicopter Society 64th Forum, Montreal Canada Apr. 29-May 1, 2008.

(Continued)

*Primary Examiner* — Fadey Jabr
*Assistant Examiner* — Aaron L Troost
(74) *Attorney, Agent, or Firm* — Jason Davis

(57) ABSTRACT

Frequency multiplexed command signaling that permits a single pilot command interface (e.g. control stick) to serve as a multiple response mode interface for piloting a craft conforms with natural interface operation of most pilots. Highly augmented modes receive lower frequency components of the command signaling, and less augmented modes receive higher frequency components. This avoids the requirement for pilots to switch response modes. An embodying control system can be produced by running feedback control loops encoding the respective response modes in parallel, and multiplexing the command signaling to each response mode, filtering each copy of the command signaling respectively according the respective feedback control loop, and then combining the output of each feedback control loop to compute actuation demand.

20 Claims, 6 Drawing Sheets

(56) References Cited

U.S. PATENT DOCUMENTS

| | | | |
|---|---|---|---|
| 6,868,315 B2 | 3/2005 | Hellio et al. | |
| 6,885,917 B2 * | 4/2005 | Osder et al. | 701/3 |
| 7,433,765 B2 | 10/2008 | Fanciullo et al. | |
| 2008/0097658 A1 * | 4/2008 | Shue et al. | 701/8 |

OTHER PUBLICATIONS

Irwin et al., "ADS-33E Predicted and Assigned Lowspeed Handling Qualities of the CH-47F with Digital AFCS", 63rd AHS Forum, vol. 2, p. 809-838 Virginia Beach, VA, May 1-3, 2007.

Johnson et al., "RAH-66 Comanche Flight Test Correlation with Model Predictions: Velocity Stabilization and Altitude Hold Modes", presented at the AHS 4th decennial conference on Aeromechanics, Jan. 21, 2004.

Anonymous, Handling Qualities Requirements for Military Rotorcraft, Aeronautical Design Standard, ADS-33E-PRF, United States Army Aviation and Missile Command, Aviation Engineering Directorate, Redstone Arsenal, Alabama, Mar. 21, 2000.

English abstract of JP2004268730; published Sep. 30, 2004, Yamaha Motor Co. Ltd.

Supplementary European Search Report.

* cited by examiner

RESPONSE MODE FOR CONTROL SYSTEM OF PILOTED CRAFT

CROSS-REFERENCE TO RELATED APPLICATIONS

This application is a national phase entry of International Patent Application PCT/CA2009/001866 filed Dec. 18, 2009.

FIELD OF THE INVENTION

The present invention relates in general to control systems of piloted craft that employ feedback and command signaling to actuators for redirecting the craft, and in particular relates to a response mode that incorporates advantages of highly augmented response modes and minimally augmented response modes, while avoiding disadvantages of each.

BACKGROUND OF THE INVENTION

The art of flight control law design is couched in a trade-off between maneuverability and stability. While in theory, optimal responsiveness of an aircraft can be provided by permitting a pilot to operate each control surface and throttle to the maximum actuation range in every situation, in practice this is generally not desirable, in part because of unsafe combinations of actions given the interrelation of the control elements, environment, and instantaneous orientation and motion of the aircraft, and because of the very high workload involved in controlling multiple effectors concurrently to retain stability of the aircraft. It is generally difficult to achieve a balance that permits a pilot to safely and productively operate the aircraft while retaining stability in a wide variety of conditions, without requiring a very high workload. One known technique for breaking this trade-off is by defining different response modes that generally provide adequate workload and adequate maneuverability for the pilot in respective ranges of operating conditions.

For rotorcraft, in some operating conditions high levels of stability augmentation are desired (and even specified by design standards), and low levels of stability augmentation are desired for other conditions. For example, in degraded visual environments modes with high levels of stability are typically selected, whereas low levels of stability augmentation are typically specified for flight in conditions where visual cueing is good. These modes have contrary objectives: in response to a change in command, the stability augmented response modes are slower to respond, but minimize the effect of disturbances from interaction with an environment, and, in contrast, high mobility modes provide greater responsiveness but are more greatly affected by the environment. Minimally augmented response modes allow the pilot to be more aggressive, and more precise with the handling of the aircraft, whereas the highly augmented modes provide security associated with higher stability, and reduce the pilot's workload, as less effort is needed to continuously balance and counterbalance controls to stabilize the aircraft. Usually in poorly cued environments, the pilot will not typically attempt to manoeuvre the aircraft aggressively owing to the lack of visual references. Highly augmented modes may also be desired when photographing, lifting or manipulating objects, for example.

Response modes of rotorcraft control systems, known as response types, determine how the rotorcraft responds to a given pilot input. For modern rotorcraft, lateral and longitudinal axis response types in increasing levels of augmentation (stability) are: Rate Damped (RD), in which the angular velocities of the fuselage (roll and pitch) are proportional to pilot inceptor (stick) displacement; Attitude Command/Attitude Hold (ACAH), in which the angle of the fuselage (roll and pitch) is proportional to stick displacement; and Translational Rate Command (TRC), in which aircraft velocity (airspeed, or groundspeed) is proportional to stick displacement.

Mode transitions in modern rotorcraft, including fly-by-wire rotorcraft, are typically manually selected by the pilot or armed for conditional transition for example, in response to a function of airspeed and (in some cases) on control stick position. For example, in the CH-47F the control system response type will change automatically from ACAH to TRC at speeds below 10 knots provided the pilot has armed the TRC control mode. However, it is possible for the pilot to fly with an ACAH response type from forward flight into the hover by not arming the TRC control mode. If the pilot opts not to arm TRC, then the pilot risks that upon achieving the hover that the visual conditions may degrade owing to the rotor downwash, as can commonly happen in desert/dusty, or loose/light snow conditions (a state known as 'brownout', or 'whiteout' respectively), or during fog or in low-light conditions. In such a case, the pilots would then have to make an additional action to arm and engage the TRC response type upon encountering the brownout or whiteout condition, which focuses pilot attention on managing the control system, rather than flying the aircraft, at a very critical time. Conversely, if the pilot opts to employ TRC in a well cued environment, it is possible to encounter situations that may warrant a desired immediate switch in control response to ACAH, or Rate Command. For example, if during a landing task in a hostile area, a weapon carrying enemy soldier is spotted, then the pilot might prefer to have the more aggressive performance characteristics of ACAH or Rate Command over the stability of TRC; once again requiring a discrete mode switch that focuses pilot effort on managing the control system rather than flying the aircraft.

While it may be frequently useful to provide the operator with the ability to manually switch between these modes, and the decision about modes may often be non-problematic for pilots, there are situations where transitions between these modes is difficult or requires the pilot's attention at an inopportune moment. These cueing conditions do not typically correspond uniformly with groundspeed, altitude, stick position, or other aircraft or sensor indications, and thus automatic triggering in response to such indications may be inconvenient or unhelpful or even dangerous. Layers of triggers for multiple transitions are complex, and require greater management of the control system by the pilot. Armed transitions are triggered in response to the specified condition, and are generally only as useful as the prediction made at the time of arming the transition, that once the specified condition is met, the transition will be desired. It is exceedingly difficult to arm for unexpected transitions, and these are generally when they are most needed.

U.S. Pat. No. 7,433,765 appears to disclose a fly-by-wire (FBW) static longitudinal stability system which provides an unobtrusive airspeed hold function that reacts to pilot control inputs and the measured states of aircraft, to engage smoothly without any explicit mode selection by the pilot when the aircraft is in a trimmed, non-accelerating state and disengages smoothly when the pilot commands an aircraft pitch or yaw manoeuvre. This system is limited to engaging or disengaging a single mode. The engagement or disengagement is responsive to pilot control inputs and the measured states of the aircraft: i.e. the attitude, and motion of the aircraft determines the mode.

U.S. Pat. No. 4,645,141 discloses an automatic flight control system which allows the pilot to manually control a helicopter by displacing the control stick and automatically return to hover position hold or a hover velocity hold upon a natural release of the control stick. The system of U.S. Pat. No. 4,645,141 seems to have a very limited capability of controlling the flight based on the sensed behaviour of the control stick, with automatic control engaging only upon "natural release" of the stick and being limited to hover position or hover velocity control.

Other air, marine and aerospace craft that use multiple response modes for turning command signals into control output for actuating control means that permit feedback-based redirection of the craft are equally susceptible to conflicting rationale for different response modes in different conditions. Such craft may include: blimps and dirigibles, fixed wing aircraft, submarines, ships (docking systems), unmanned aerial vehicles, unmanned underwater vehicles, landing craft, orbital vessels for docking with other orbiters, and the like.

In an unrelated field, WO 01121981 to McIndoe et al. teaches an apparatus and method for operating a continuously variable transmission, such as a toroidal drive type transmission of a land motor vehicle. The continuously variable transmission is selectively operated in either a torque control strategy or a ratio controlled strategy, depending on the operating conditions of the vehicle, and thereby benefits from the advantageous aspects of both the torque and ratio control strategies, while avoiding the disadvantageous aspects of both strategies. Specifically, the transition from the torque control strategy to the ratio control strategy (and vice versa) can be accomplished by simultaneously calculating the control\pressures that would result from operation in both the torque and ratio control strategies, and further assigning a weighted value to each of such calculated control pressures based upon current operating conditions. The summation of such weighted values provides a composite control signal that facilitates a smooth transition between the two control strategies.

This equipment controls a single pneumatic device that controls transmission in a motor vehicle, which is not a craft, and although negative feedback is used to damp changes, this is not a feedback control loop that uses information from sensors, let alone sensors that relate to the orientation and/or motion of the vehicle. The control strategies are not response modes, as they do not involve any control law.

In the present field, there is a need for new methods for transitioning between response types of rotorcraft that permits pilots to transition seamlessly between modes having different degrees of augmentation. Preferably such transitioning is provided in an intuitive manner that requires minimal training for pilots.

SUMMARY OF THE INVENTION

Applicant has devised a technique that permits a single control stick or other pilot command interface to effectively serve as an independent controller of multiple modes, all at the same time. Thus a single response mode that features the stability of highly augmented modes, but also retains the manoeuvrability of minimally augmented modes, is possible. This is accomplished by dividing command signalling from the pilot command interface in a manner that generally presents higher frequency components of the command signalling to less augmented mode treatment, and presents lower frequency components of the signalling to more highly augmented mode treatment. As pilots demanding greater precision and responsiveness usually generate more abrupt command signaling, and pilots trying to stabilize tend to generate smoother command signalling, this natural tendency can be used to provide corresponding signalling to respective modes. The frequency division of the command signalling effectively permits the same pilot command interface to concurrently provide multiplexed input, with commands generated in a natural fashion.

If there are more than 2 response modes concurrently processed, they are substantially ordered with respect to degree of augmentation. For example, in general, actuating a control surface, thrusters, (or the like) of a craft typically causes an acceleration of the craft with respect to the local air/water/space. This acceleration is not usually linear with respect to the degree of actuation, nor is it independent of other actuations, the state of the craft, or the environment. The workload involved in stabilizing a craft's velocity with only accelerations generally involves significant pilot workload, especially in dynamic environments, and accordingly a first augmented mode may be designed to stabilize the craft with respect to governing a velocity of the craft. Likewise, with only velocity at the pilot's command, it can be difficult to control a position (with respect to the local air/water/space, or to the ground), and accordingly craft that are designed to hover or execute spatially constrained actions like docking (e.g. rotorcraft, dirigibles, orbiters) may further incorporate position command.

In rotorcraft, redirection of the craft horizontally generally involves tilting the rotor disc and thereby the fuselage of the rotorcraft in pitch and roll (i.e. along transverse and longitudinal axes) to shift the thrust vector of the main rotor, resulting in an acceleration of the rotorcraft in the direction of tilt. Similarly with all craft that have a principal thruster that acts in only one direction, orientation of the craft dictates the direction in which the craft can be (subsequently) accelerated, and changes in direction require orientation control which may require joint action from several orienting control elements that may be best provided with attitude control.

For example, each response mode may be associated with a respective control feedback loop encoded as special purpose hardware, and different filters may be applied to copies of the command signaling sent to the control feedback loops to selectively deliver frequency components of the command signaling to the respective hardware. Alternatively the two (or more) response modes may be separate software processes or threads performed on a single hardware device. In other embodiments a single program may effectively receive a single copy of the command signaling and the orientation and motion feedback, and compute a result that is substantially equivalent to processing by respective feedback control loops, and aggregating the result.

The output of each feedback control loop may collectively determine the actuation demand at any given instant. For example the output of feedback control loops may be summed to form actuator demand. The sum may be weighted. The weights of the respective feedback control loops may vary depending on recent operating conditions. In general the weighting may polarize the response mode usage, to promote output produced according to only one of the response modes to dominate the actuator demand, it may normalize the output to encourage a sharing of the actuator demand, or may be neutral in this respect. To the extent that the weighting function polarizes the response mode usage, there may be an unsmooth transition between how command signalling is handled when transiting from principally one mode to principally another mode, and accordingly the polarizing effect may be minimized when substantially equal In some embodiments the command signalling is partitioned such that within the limits of the electronics, all of the frequency spectrum of the command signalling is sent to one and only one of the feedback control loops for processing according to one of the respective response modes. In other embodiments it is sufficient that all of the frequency spectrum within an operating range is sent to at least one of the feedback control loops, but it is permissible that the same frequency components be processed according to two or more response modes. Finally in other embodiments it is sufficient that there be no perceptible gaps such that the pilot recognizes that some of their input is not acted upon.

In accordance with the present invention a control system is provided for a craft, the control system having at least two response modes of differing stability augmentation that each receive command signaling from a pilot command interface, and orientation and motion feedback from the craft, the response modes respectively generating information that collectively is used to determine actuator demand for redirecting the craft. This control system is characterized in that more lower frequency than higher frequency components of the command signalling are processed according to the more highly augmented response mode, and more higher frequency components than lower frequency components of the command signalling are submitted to the less augmented response modes.

In accordance with the present invention, a method is provided for generating actuator demand for redirecting a craft in response to command signaling from a pilot command interface, and orientation and motion feedback from the craft. The method involves: providing at least two response modes of differing stability augmentation, dividing the command signaling into at least two parts; and submitting the divided parts to respective response modes so that the response modes collectively generate information for determining the actuator demand. This method is characterized in that more lower frequency than higher frequency components of the command signaling is processed by more highly augmented response modes, and more higher frequency than lower frequency components of the command signaling are submitted to less augmented response modes.

In accordance with the present invention, an aircraft control system is provided that includes command signaling from a command interface of the aircraft communicatively coupled with a first and a second feedback control loop encoding respective first and second response types for deriving flight control output in response to the command signaling, aircraft state data, and flight control laws of the aircraft, wherein connections between the command interface and the first and second feedback control loops supply more higher frequency than lower frequency command signalling to the first feedback control loop which has a lower degree of augmentation, and more lower frequency than higher frequency command signaling to the second feedback control loop, which has a higher degree of augmentation.

Accordingly a craft can be controlled according to a single response mode that is suitable for aggressive and precise maneuvering, but also has excellent stability and can be used in high stability modes. Slow, deliberate, pilot input is processed according to highly augmented response modes, resulting in highly stabilized output: whereas rapid, high frequency pilot input generate more aggressive response characteristics. This takes advantage of the natural tendency of pilots to alter how they operate the pilot command interface when faced with reduced visual cueing, or more generally when desiring more stability, in comparison with how they naturally tend to operate the pilot command interface when a sudden change is desired.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
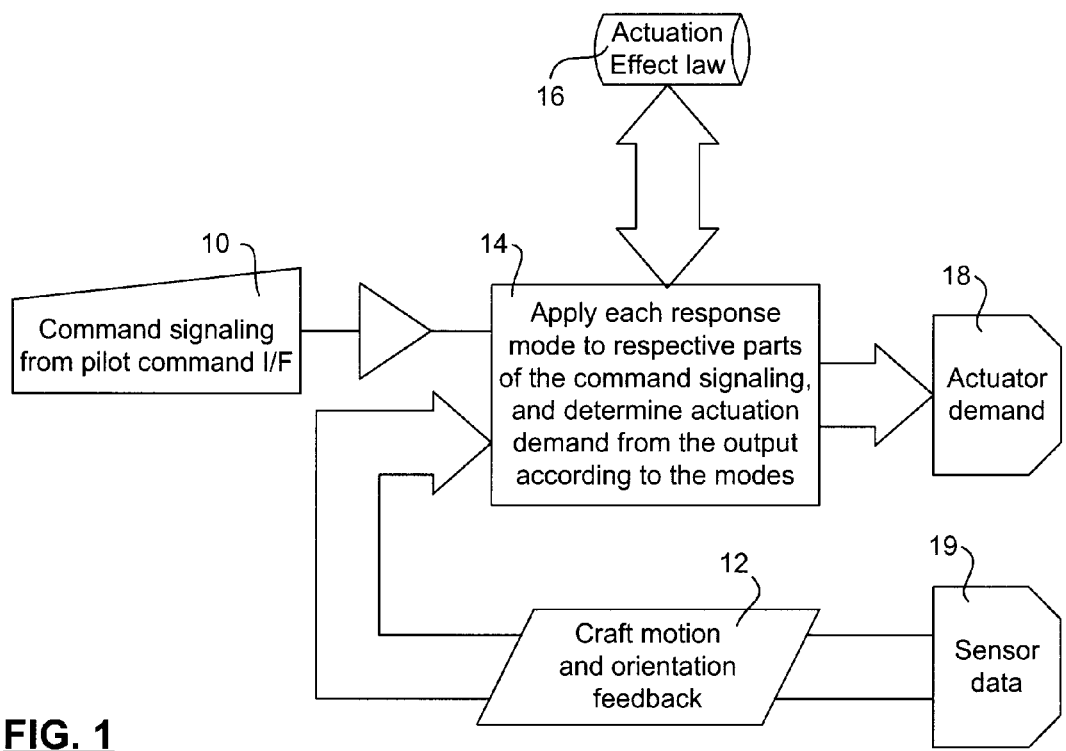
FIG. 1 is a flow chart schematically illustrating a continuous process performed by a control system for a craft, in accordance with an embodiment of the invention.

FIG. 1 is a schematic illustration of a flowchart showing the process according to an embodiment of the invention. There are three principal elements of a craft control system: command signaling from a pilot command interface 10; craft motion and orientation feedback 12; and a process loop 14 that applies respective response modes to respective parts of the command signaling to determine actuator demand from the output from the respective parts treated according to the respective modes. Each response mode is (at least notionally) a respective process for determining actuation demand in response to craft motion and orientation feedback 12, command signaling 10, and actuation effect law 16 that dictates how the craft will implement the command signaling given the motion and orientation feedback, and send this to one or more actuators as actuator demand 18. The implementation is generally an iterative process whereby the process seeks to minimize one or more difference or "error" values computed between the command signaling 10 and craft motion and orientation feedback 12. The craft motion and orientation feedback 12 is generally provided from sensor data 19 from a plurality of sensors. The sensor data 19 is expected to be affected by the actuation of the actuator in response to the actuator demand 18 in accordance with the actuation effect law, but is not determinative of the outcome given environmental variables.

In accordance with the invention, the part of the command signaling sent to respective response modes involves sending more higher (than lower) frequency components of the command signaling to less augmented (generally more stable and less responsive) response modes, and more lower (than higher) frequency components of the command signaling to more augmented (generally more responsive and less stable) response modes. If there are more than two response modes, preferably they are linearly ordered with respect to augmentation, at least over a broad range of expected operating conditions.

The command signalling may be partitioned such that within the limits of the electronics, all of the frequency spectrum of the command signalling is sent to one and only one of the feedback control loops for processing according to respective response modes. In other embodiments it may be sufficient that all of the frequency components within an operating range are sent to at least one of the feedback control loops, but the same (overlapping) frequency components may be processed according to two or more response modes. In less exigent control systems, it may be sufficient that there be no perceptible gaps such that the pilot recognizes that some of their input is not acted upon. Still in other embodiments, it may be desired to have null frequency regions separating the active modes in the frequency domain that permit the discrete transitioning between modes. If gappy response is used, it may be preferable to provide feedback to the pilot at the pilot interface to indicate which mode is active, and indicating whether the present actuation is being ignored. While this may be provided with light or sound, it may be preferable to provide haptic feedback, which may provide graduated resistance or "stiffness" as a function of augmentation (e.g. the least augmented modes have the greatest stiffness, and the most augmented modes have a least stiffness, or vice versa). Applicant has found that the summed output of frequency parts of command signaling processed according to respective modes provides for smooth cross-over between modes that is particularly efficient and intuitive for the pilot.

Figure 2:
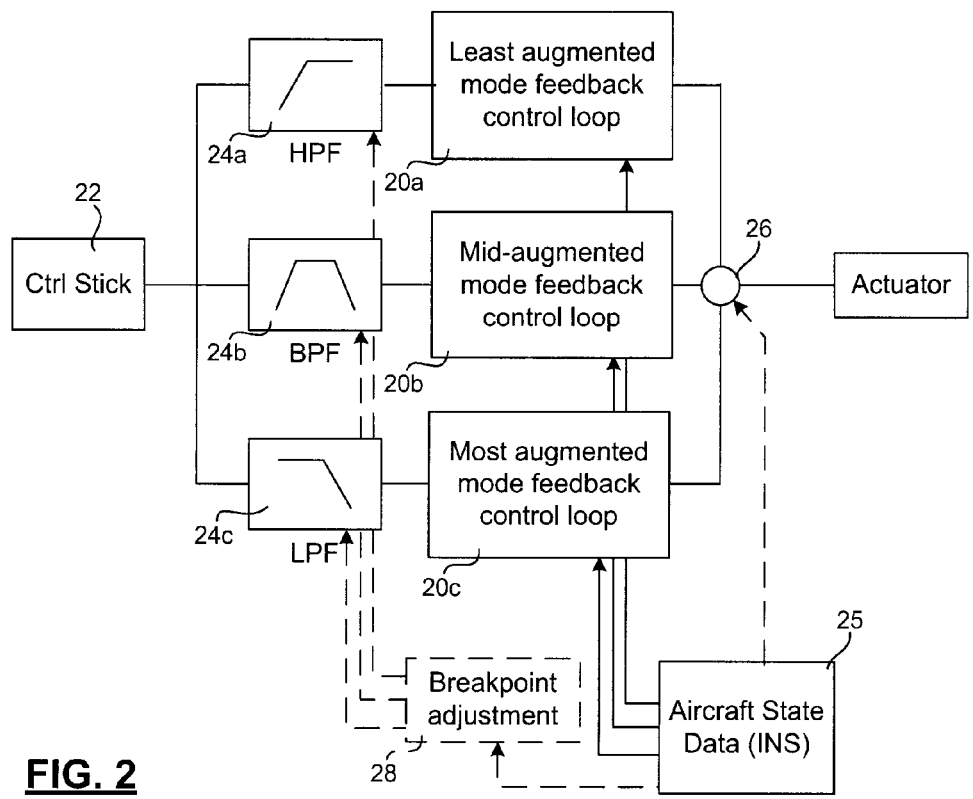
FIG. 2 is a schematic illustration of a control system, in accordance with an embodiment of the invention.

FIG. 2 is a schematic illustration of a control system of an aircraft providing a frequency multiplexed multi-mode response type in accordance with an embodiment of the invention. Three parallel feedback control loops $20a,b,c$ are provided that receive command signaling from a Control Stick 22, via respective filters $24a,b,c$, as well as Aircraft State Data 25, such as an Inertial Navigation System (INS), to derive actuator demand signals that are combined to produce a final actuator demand sent to one (or more) actuator 26. As shown schematically the filters $24a,b,c$ are a High Pass Filter (HPF), a Band Pass Filter (BPF), and Low Pass Filter (LPF), respectively. The filters may have fixed transmission properties, or may be tuneable. If they are tuneable, they may be controlled by suitable electronics (such as Breakpoint adjustment processor 28) in response to aircraft state information (published by the Aircraft State Data 25) to change parameters of passed frequency components of the command signaling, such as the frequency limits, and roll-off parameters. The optional Breakpoint adjustment processor 28 allows for some flight conditions to manage flight control system, for example widening a bandpass frequency window of the BPF $24b$ when the groundspeed of the aircraft exceeds 30 knots while steadily decreasing the break point for the LPF $24c$.

The Aircraft State Data 25 receives sensor data, and computes and publishes airspeed readings, orientation (heading, pitch, yaw, roll), global positioning, altitude readings, rates of change of these parameters, etc. Actuator feedback, accelerometer readings, measures of stability, and other parameters may be included as feedback for one or more of the feedback control loops 20.

The feedback control loops respectively encode most, mid and least augmented modes in the illustrated embodiment. They embed flight control law in the process of computing respective actuator demand outputs. The modes may be orientation-based, airspeed based, ground speed or position based, elevation-based, acceleration-based, or based on a flight path, such as flight path angle-based.

The feedback control loops may be embodied as separate processors as shown, although it will be appreciated by those of skill in the art that different computing and processing functions shown as separate blocks in FIG. 2 may be assembled and differently and performed by different electronics configurations and may involve different numbers of processors. Cost, computational efficiency, and weight savings can generally be provided by performing all of these functions within a single integrated circuit. On the other hand, fail safety and system ruggedness may suggest a need for the redundancy provided by the separate feedback control loops. One advantage of using separate processors for each feedback control loop is that it is relatively easy to provide the frequency multiplexed multi-mode response type as well as the individual modes or combinations of only two of the modes.

The determination of the actuation demand signals at any given instant with the output of each feedback control loop may simply involve summing the respective outputs. The summing may be weighted and the weighting may be statically provisioned, or changeable. In some embodiments, the weighting may be continuously updated in response to the aircraft state information. The weights of the respective feedback control loops may further vary depending on recent operating conditions. In general, the weighting may skew the actuator output from the response modes, 1—to promote output produced according to only one of the response modes, for example to encourage one response mode to dominate at a time, 2—it may promote a sharing of the actuator demand, increasing equalization of the response mode actuator demand signals, or 3—may be neutral in this respect, sometimes equalizing and sometimes promoting dominance. For example, a persisting high error, or erraticity of the error with respect to expected results of one feedback control loop in comparison with the errors of the others (as computed from information published by the Aircraft State Data 25, or from the feedback control loops 20), may indicate that the one feedback control loop is not currently dominant, and this comparison value can be used in a feedback control loop for controlling a combiner 26 to selectively weight the actuator demand signals from the respective feedback control loops 20. To the extent that the weighting function promotes single response mode domination, there may be an unsmooth handoff between dominant response modes. There are various algorithms and mechanisms for smoothing this if needed, that depend on the flight laws of the aircraft.

If the aircraft is a rotorcraft, the most augmented mode feedback control loop $20c$ may be a translation rate command loop, the mid augmented mode feedback control loop $20b$ may be an attitude command attitude hold control loop, or the least augmented mode feedback control loop $20a$ may be the rate damped loop.

While the foregoing examples show control systems in one axis, it will be appreciated that control sticks generally use 2 or more axes and that the command signaling is naturally divided between these axes. It is not necessary that the same control mode be provided in both (or all) axes.

EXAMPLES

Figure 3:
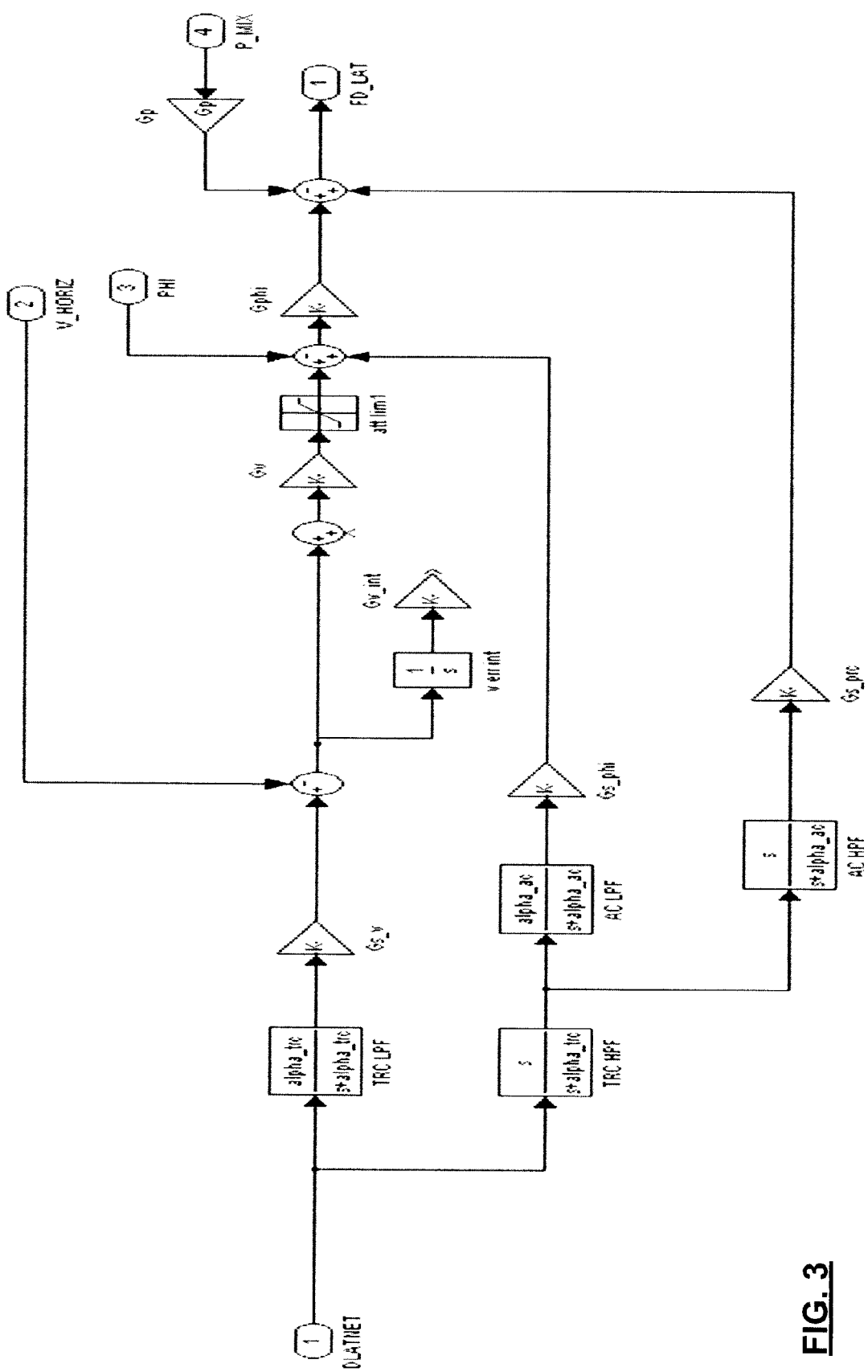
FIG. 3 is a simulation diagram of a frequency multiplexed multi-mode feedback control loop for a rotorcraft control system used to demonstrate the invention.

FIG. 3 is a schematic of a Matlab Simulink diagram of an embodiment of a frequency multiplexed multi-mode response type used in simulation of lateral axis motion of a helicopter, which later formed the starting point for coding the controller for experimental flight testing. The pilot control input (DLATNET), is separated in terms of frequency content by passing through the filter network, consisting of the translational rate command low pass filter (TRC LPF), the attitude command/attitude hold band pass filter (TRC HPF and AC LPF) and the rate command high pass filter (AC HPF). Each path receives respectively filtered signals that are independently amplified to provide relative weightings for each path: GS_V is the gain on the velocity command, GS_phi is the gain on the attitude command, and GS_prc is the gain on the rate command. The rest of the structure is essentially a standard feedback control system, with the following features. The velocity command is differenced with the lateral velocity to determine an error signal, which is then amplified (GV) and limited (att lim1). An integral function can be added to the signal (v err int) if desired (currently not connected). The result is an attitude command, which is summed with the frequency divided attitude command (GS_phi), and then differenced with the measured attitude (PHI). The resulting error signal is amplified (Gphi), and then summed with the result of the rate command path (GS_prc). This is differenced with the aircraft rate (P_MIX), which itself was gained (Gp). This final resulting signal is sent to the aircraft actuator to effect control of the aircraft in the lateral axis. A similar control system to that described above was also applied in the longitudinal axis.

In general the frequency multiplexed multi-mode response type was found to improve handling in comparison with the individual mode responses, and in particular in comparison with a translation rate command response type. Specifically, experimental flights on a Bell 412 HP were performed.

Figure 4A:
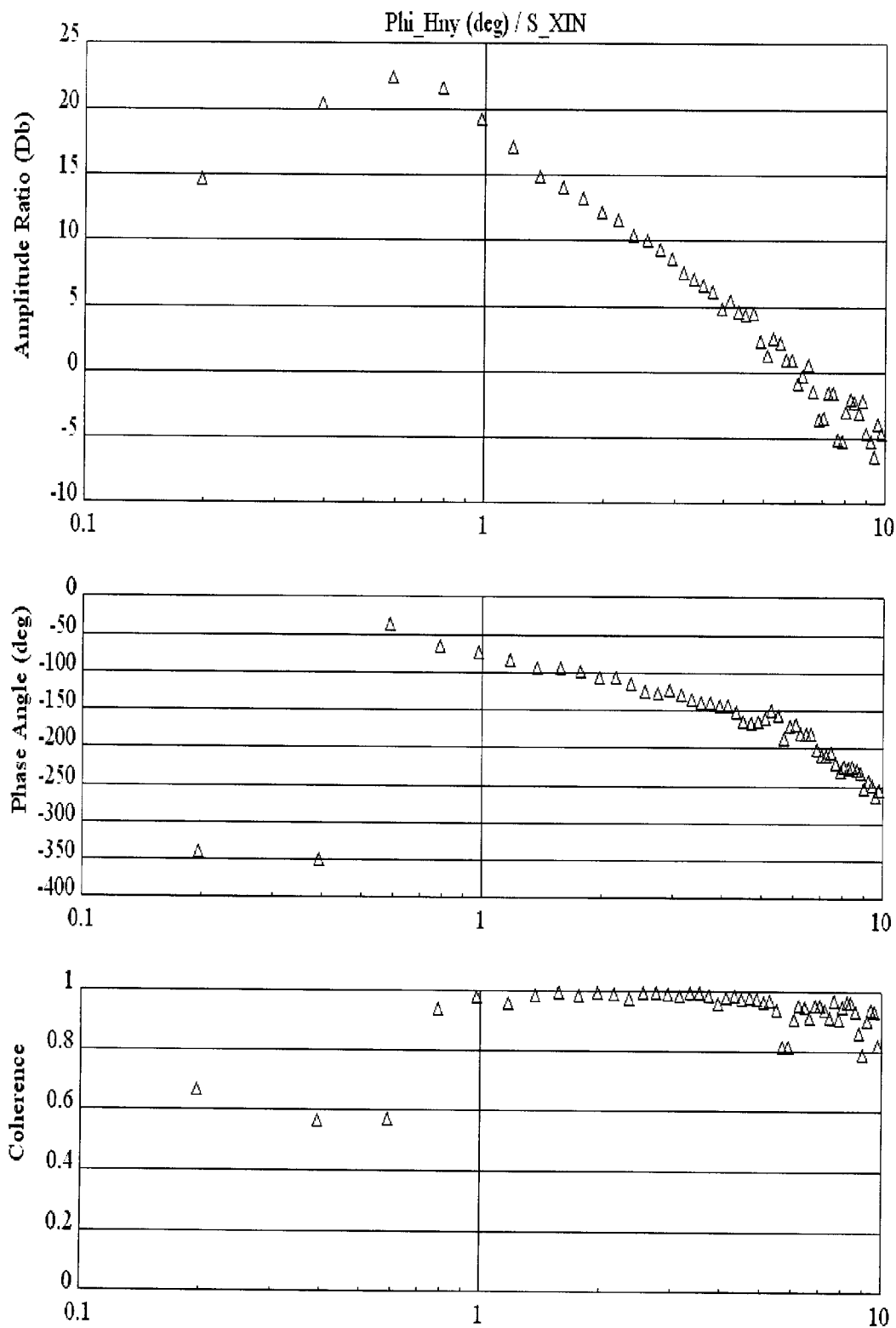
FIGS. 4a,b are frequency response graphs of flight test experimental data showing roll axis frequency response for a TRC mode feedback control loop, and a frequency multiplexed multi-mode feedback control loop, in accordance with an embodiment of the invention.

FIGS. 4a,b and 5a,b graph flight data collected during testing of the invention. Data was collected using instrumentation installed on the NRC Bell 412 fly-by-wire research helicopter. For comparison, and to demonstrate the advantages of the invention, data from a standard translational rate command system is also presented. FIG. 4a shows a frequency response plot (Bode diagram) of the standard Translation Rate Control (TRC) flight control system. The plot shows the aircraft roll attitude (Phi_Hny) resulting from pilot lateral stick input (S_XIN).

Figure 4B:
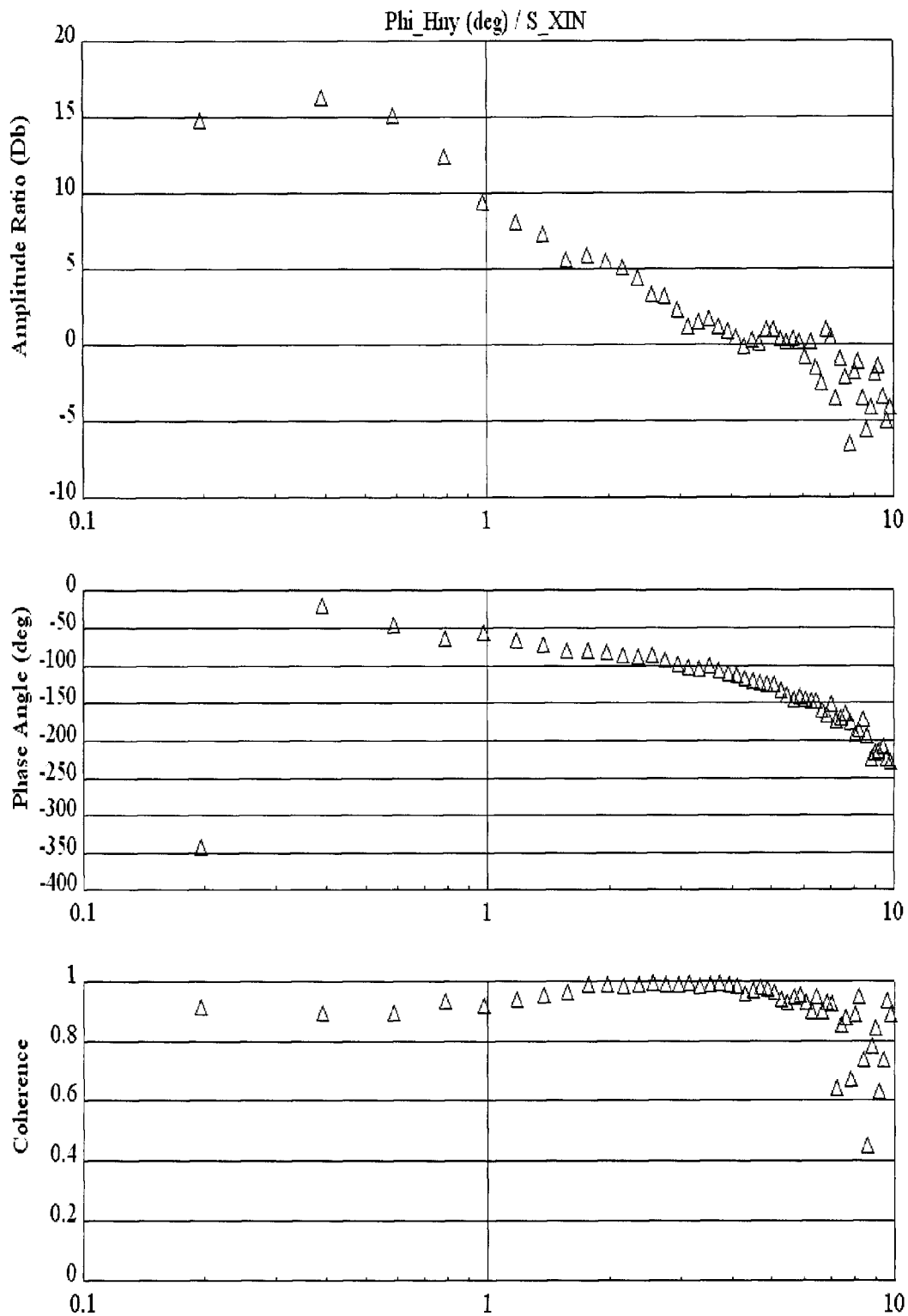

The most important feature to examine on this plot is the phase bandwidth, as determined by the frequency where the phase angle crosses −135 degrees. This occurs at approximately 3 rad/sec. FIG. 4b shows the same response plot, but for an embodiment of the invention. In this case, the phase bandwidth is considerably higher, at approximately 5 rad/sec. Aeronautical Design Standard ADS-33E-PRF indicates that a higher phase bandwidth improves the aircraft handling qualities and allows the pilot to more precisely manoeuvre the helicopter.

Figure 5A:
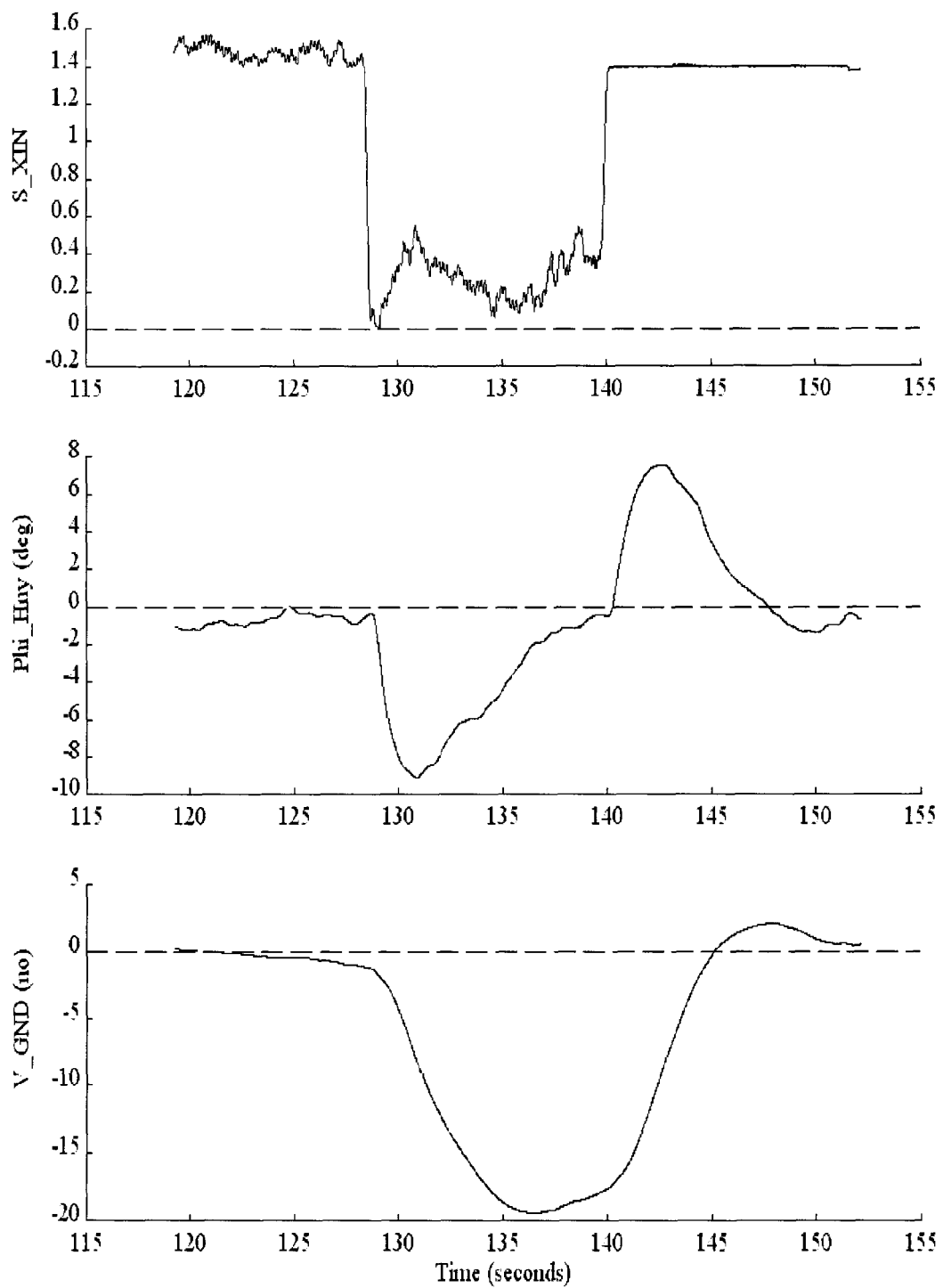
FIGS. 5a,b are graphs of flight test experimental data showing step function response for the TRC mode feedback control loop, and the frequency multiplexed multi-mode feedback control loop.
Figure 5B:
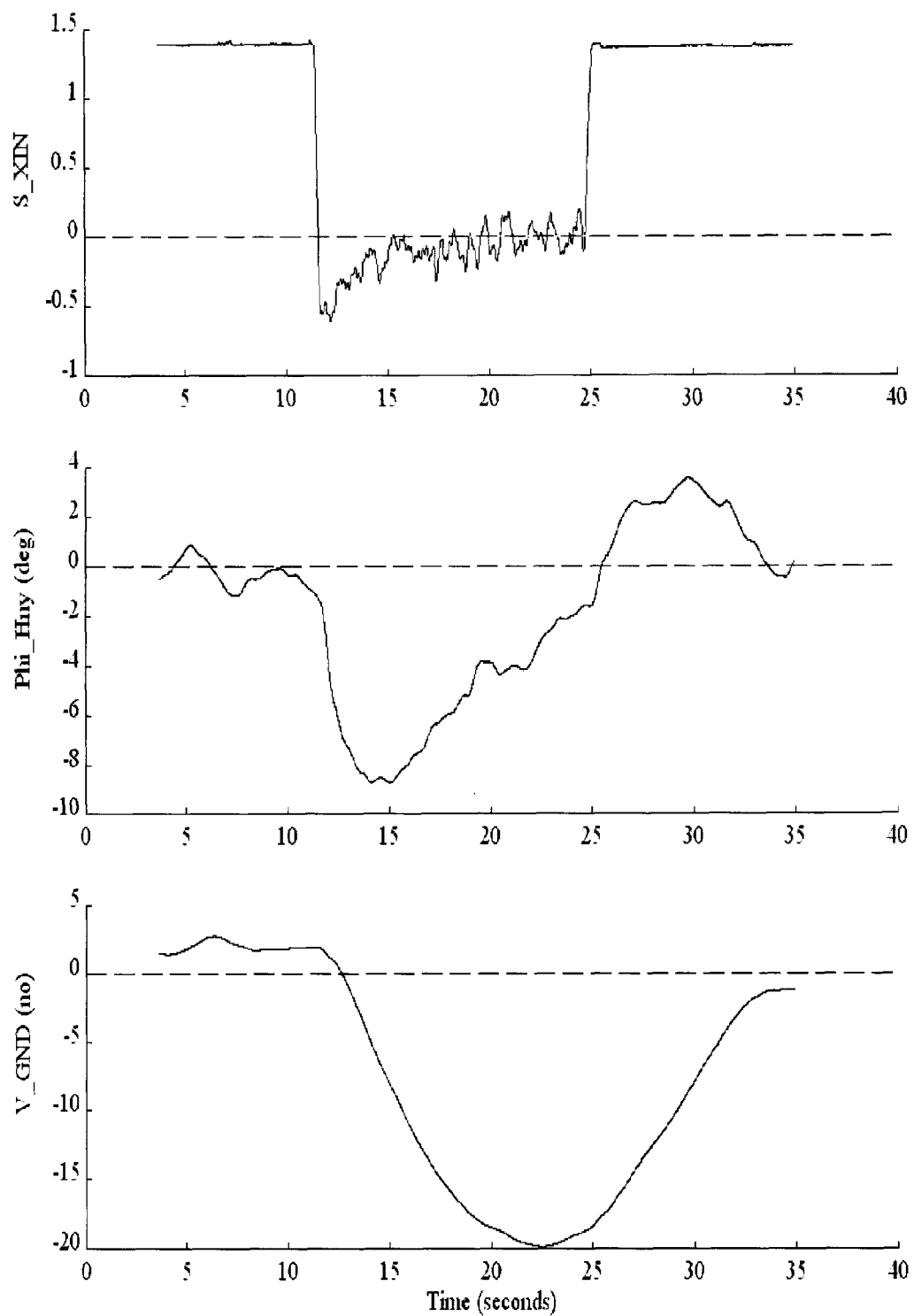

FIG. 5a shows the helicopter response to a lateral step input (S_XIN) of approximately 12 seconds duration for the standard TRC flight control system. The aircraft responds by rolling (Phi_Hny) in the direction of the input, followed by a roll in the opposite direction when the input is removed. The aircraft velocity (V_GND) rises in response to the input, then moves to near zero when the input is released, indicating a return to the hover condition. While the pilot control input is constant (after approximately 140 seconds) the aircraft remains in the hover with no further commands from the pilot. FIG. 5b shows a similar response for an embodiment of the invention, the key difference being the return and maintenance of a hover with no pilot input. Aeronautical Design Standard ADS-33E-PRF indicates that for flight in poor visual conditions, a TRC type of response, as shown in the plots, is required for good handling qualities and lower pilot workload.

Essentially, FIGS. 4a,b and 5a,b have shown that the invention can provide a high bandwidth response enabling precise manoeuvring and control of the helicopter, while also providing sufficient stability to allow improved handling qualities for flight in poor visual conditions.

REFERENCES

The contents of the entirety of each of which are incorporated by this reference.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. At least one processor encoded with at least two response modes with a first response mode having a higher stability augmentation than a second response mode, the response modes adapted to use command signaling from a pilot command interface of a craft, and orientation and motion feedback from the craft, to generate information that is collectively used to redirect the craft, where the at least one processor is adapted: to receive the command signaling in two parts, a first part having more lower frequency than higher frequency components of the command signaling, and a second part having more higher frequency than lower frequency components of the command signaling; and to process the first part according the first response mode, and the second part according to the second response mode.

2. The at least one processor according to claim 1 further adapted to divide the command signaling into the two parts in dependence on the orientation and motion feedback.

3. The at least one processor according to claim 1 wherein the craft is an aircraft, the orientation and motion feedback are aircraft state data, and the at least two response modes are embodied as separate processes for computing actuator demand.

4. The at least one processor according to claim 3 that provides the components of the command signaling to the separate processes.

5. The at least one processor according to claim 4 wherein the at least one processor includes a respective processor for each of the separate processes.

6. The at least one processor according to claim 4 further comprising a hub for multicasting the command signaling coupled to respective filters, each filter adapted to filter out frequency components of the command signaling that are not sent to the respective process to which the filter is communicatively coupled.

7. The at least one processor according to claim 6 wherein the filters have controllable transmission properties and the at least one processor is further adapted to provide a process for changing the filter properties in response to the aircraft state data.

8. The at least one processor according to claim 3 wherein the at least one processor is further adapted to provide a combining process for combining actuator demand from the respective separate processes to produce a combined control output for redirecting the aircraft.

9. The at least one processor according to claim 8 wherein the combining process is adapted to produce a weighted sum of the actuator demand from the respective separate processes, the weighting applied depending on recent operating conditions of the craft.

10. A method for generating actuator demand for redirecting a craft in response to command signaling from a pilot command interface, and craft orientation and motion feedback, the method comprising:
- encoding, in one or more processors, at least two response modes of differing stability augmentation;
- dividing the command signaling into at least two parts by a circuit, wherein a first part has more lower frequency than higher frequency command signaling components, and a second part has more higher frequency than lower frequency command signaling components; and
- submitting the divided parts to respective response modes so that the first part is processed by more highly augmented response modes, and the second part is processed by less augmented response modes, the response modes collectively generating information for determining the actuator demand.

11. The method according to claim 10 wherein dividing the command signaling into the at least two parts is controlled in dependence on the orientation and motion feedback.

12. The method according to claim 10 wherein the craft is an aircraft, the orientation and motion feedback are aircraft state data, and dividing the command signaling comprises multicasting the command signaling to respective filters, and submitting the divided parts comprises forwarding filtered parts of the command signaling to respective feedback control loops for independent processing of the respective filtered parts.

13. The method according to claim 10 further comprising combining control output of the respective response modes to produce a combined control output for redirecting the craft.

14. An aircraft control system comprising:
- a command interface for generating command signaling;
- at least one processor defining a first and a second feedback control loop encoding respective first and second response types for deriving flight control output in response to the command signaling, aircraft state data, and flight control laws of the aircraft, the first response type having a lower degree of augmentation than the second response type;
- a circuit communicatively coupling the at least one processor and the command interface for dividing the command signaling into at least two parts, wherein a first part has more lower frequency than higher frequency command signaling components, and a second part has more higher frequency than lower frequency command signaling components;
- wherein the at least one processor processes the first part according to the first response type, and the second part according to the second response type.

15. The aircraft control system of claim 14 wherein the aircraft is a rotorcraft, and the response type encoded by one of the feedback control loops is one of: rate damped, attitude command/attitude hold, translational rate command, and position hold.

16. The aircraft control system of claim 14 wherein the aircraft is a fixed wing aircraft and the response type encoded by one of the feedback control loops is based on control of: orientation of a fuselage of the aircraft, or a rate of change thereof, or an acceleration thereof, an airspeed or rate of change thereof, a position over ground, ground speed or a rate of change of ground speed, an altitude, rate of change thereof, or acceleration thereof, or a flight path angle or a rate of change therein.

17. The aircraft control system of claim 14 wherein the circuit permits a controllable frequency bandwidth of the command signaling to be forwarded to the respective feedback control loops, and the aircraft control system further comprises a feedback controller for adjusting the frequency bandwidth forwarded to the respective control loops in dependence on the aircraft state data.

18. The aircraft control system of claim 17 wherein the circuit comprises a hub for multicasting the command signaling to the feedback control loops via respective tunable filters.

19. The method according to claim 10 wherein the circuit is a part of the one or more processors.

20. An aircraft control system comprising:
- at least one processor encoded with at least two response types of differing stability augmentation, the response types adapted to use command signaling from a pilot interface of the aircraft, aircraft state data, and flight control laws of the aircraft, to generate information that is collectively used to redirect the craft; and
- a circuit communicatively coupled to the at least one processor for dividing the command signaling into at least two parts, wherein a first part has more lower frequency than higher frequency command signaling components, and the second part has more higher frequency than lower frequency command signaling components;
- wherein the at least one processor is configured to process the first part according to the first response type, and the second part according to the second response type.

* * * * *